May 12, 1959 B. H. DIB 2,886,017
ROTARY INTERNAL COMBUSTION ENGINE
Filed Dec. 23, 1957 3 Sheets-Sheet 1

INVENTOR
BASIL H. DIB
BY Justan Miller
ATTORNEY

May 12, 1959  B. H. DIB  2,886,017
ROTARY INTERNAL COMBUSTION ENGINE
Filed Dec. 23, 1957  3 Sheets-Sheet 2
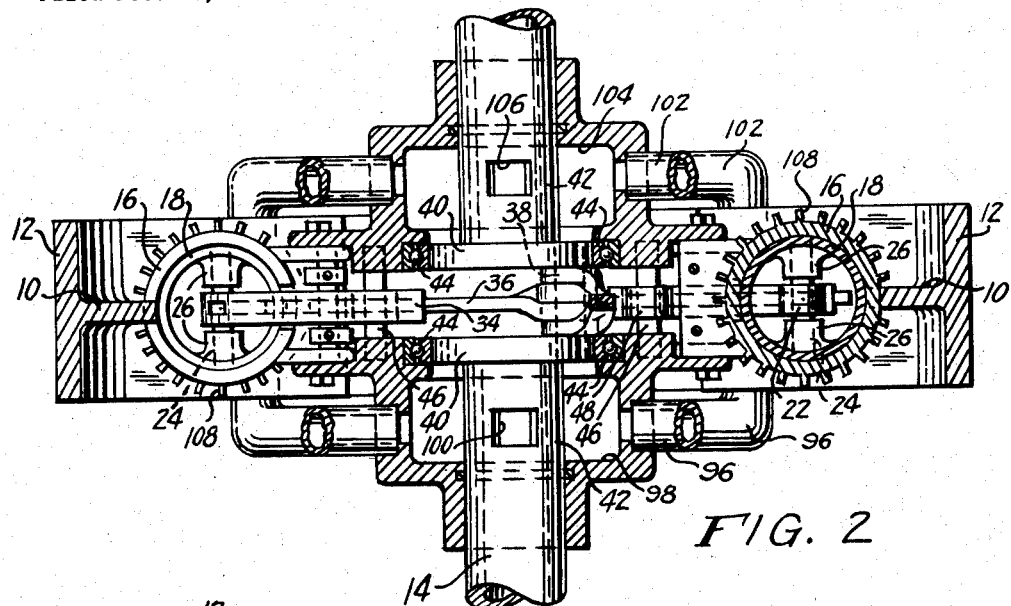
FIG. 2
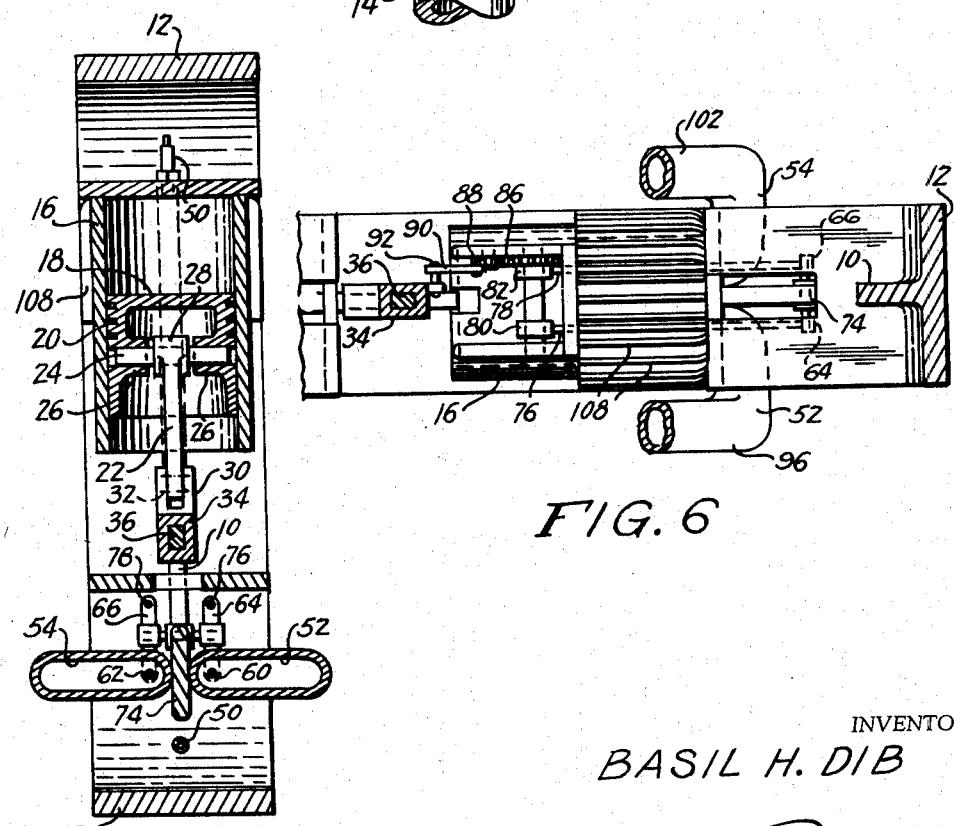
FIG. 5
FIG. 6
INVENTOR
BASIL H. DIB
BY Gustave Miller
ATTORNEY May 12, 1959  B. H. DIB  2,886,017
ROTARY INTERNAL COMBUSTION ENGINE
Filed Dec. 23, 1957  3 Sheets-Sheet 3

INVENTOR
BASIL H. DIB
BY Gustave Miller
ATTORNEY

United States Patent Office 2,886,017
Patented May 12, 1959

2,886,017

ROTARY INTERNAL COMBUSTION ENGINE

Basil H. Dib, Beirut, Lebanon

Application December 23, 1957, Serial No. 704,635

8 Claims. (Cl. 123—43)

This invention relates to an internal combustion engine, and it more particularly relates to a rotary type of engine wherein the rotation of the engine is translated into reciprocating action of the pistons in annularly-spaced cylinders.

Although various different types of the above kind of engine have heretofore been developed, these prior engines were all subject to various disadvantages. One of these disadvantages was that an insufficient amount of power was developed by these prior engines in proportion to the amount of energy put in. Another disadvantage was that they were usually subject to considerable vibration. Another disadvantage was that so many relatively movable parts were used that there was frequent tendency to breakage due to frictional wear and misalignment of the various parts.

It is one object of the present invention to overcome the above as well as numerous other disadvantages of the prior types of rotary engines by providing an engine which develops a proportionally large amount of power for the energy put in.

Another object of the present invention is to provide an engine wherein a minimum of movable parts are required for its efficient operation.

Another object of the present invention is to provide an engine which has relatively little vibration, which is relatively small and light in weight for the power developed, and which is completely and effectively air-cooled.

Other objects of the present invention are to provide an improved engine, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 2 is a sectional view taken on line 2—2 of Fig. 1.

Fig. 5 is a sectional view taken on line 5—5 of Fig. 1.

Fig. 6 is a sectional view taken on line 6—6 of Fig. 1.

Figure 1:
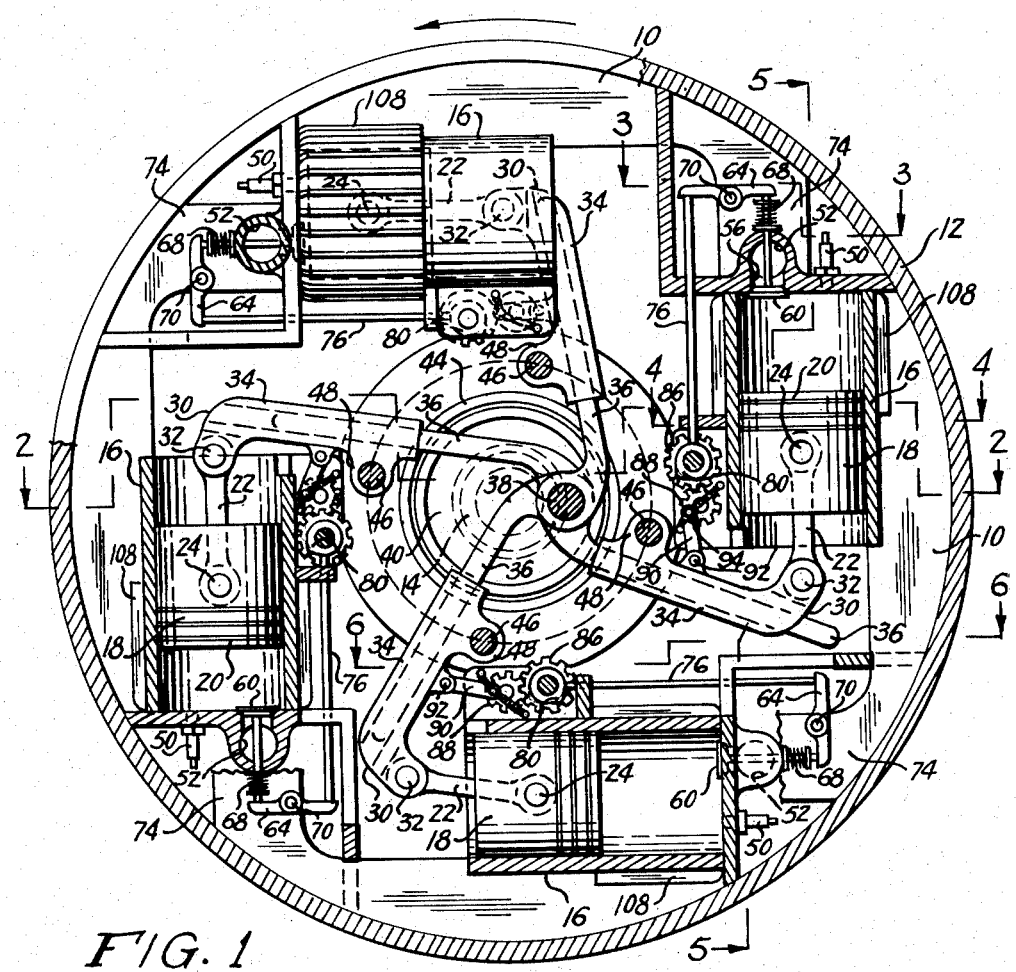
Fig. 1 is a top plan view, partly in section, of an engine embodying the present invention.

Referring now in greater detail to the drawings wherein similar reference characters refer to similar parts, there is shown a circular plate 10 having a peripheral flange 12 and rotatable around a fixed shaft 14. This plate 10 and its associated parts form the engine block of the device.

Mounted on the plate 10 are four cylinders 16, each cylinder being arranged tangentially to the axis of rotation of the plate 10. Movable within each cylinder 16 is a hollow piston 18 having a series of external grooves within which are provided piston rings 20. The pistons 18 are each connected to a connecting rod 22 by means of a pivot pin 24 which extends between bearings 26 within the piston and which passes through a hub 28 on the end of the connecting rod 22.

Each rod 22 is connected, at its opposite end, to a crank arm 30 by means of a pivotal connection 32. The crank arm 30 is integral with a sleeve 34 offset therefrom, and in this sleeve is reciprocably positioned an arm 36. Each arm 36 is provided with an offset end having an opening therein. These offset ends are positioned in overlying relationship with their openings in coincident relation. Through these coincident openings extends a crank pin 38. This crank pin 38 is fixed between a pair of circular flanges 40 separating two shaft portions 42 of the complete shaft 14. The crank pin 38 is positioned at one side of the flanges 40 so that it is eccentric to the axis of the shaft 14.

The plate 10 is provided with a central opening around the shaft portions 42 of shaft 14 and around the flanges 40 of the shaft portions 42. Between the central opening of the plate 10 and each of the two flanges 40 is provided a ball bearing 44. The plate 10 rotates around the shaft 14 and the flanges 40 and is aided in this rotation by means of the ball bearings 44.

As the plate 10 rotates, it carries the arms 36 around with it and since the axis of rotation of the plate 10 is the center of the shaft 14 while the arms 36 are connected to the eccentric crank pin 38, as the plate 10 rotates, the arms 36 are reciprocated longitudinally. This reciprocation takes place through their respective sleeves 34 which are pivoted to the plate by pivot pins 46 passing through bearing portions 48 on the sleeves. As a result of this reciprocation, the connecting rods 22 are reciprocated within their respective cylinders 16, causing the pistons 18 to reciprocate within their respective cylinders in accordance with the rotational position of the plate 10.

Figures 3, 4:
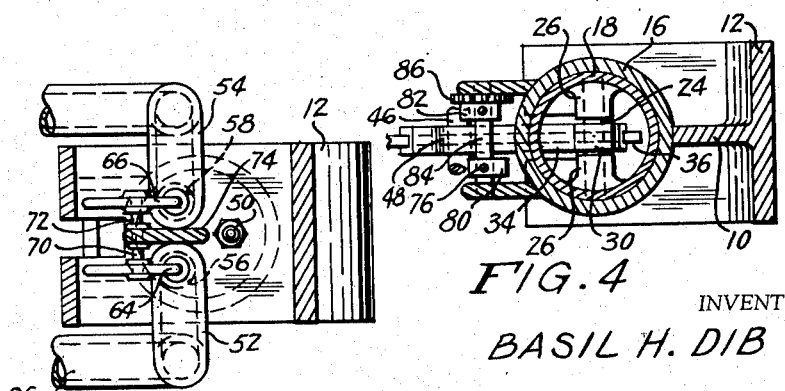
Fig. 3 is a sectional view taken on line 3—3 of Fig. 1.
Fig. 4 is a sectional view taken on line 4—4 of Fig. 1.

At the closed end of each cylinder 16 is a spark plug 50 and a pair of valve chambers 52 and 54 (best shown in Fig. 3). The valve chambers 52 and 54 are each in fluid communication with the interior of the respective cylinder 16 through separate passages 56 and 58. These passages 56 and 58 are respectively closed and opened by poppet valves 60 and 62, the stems of which extend through the top of the respective chambers into a position to be contacted by fingers 64 and 66 respectively. Each valve is spring-pressed into closed position by spring such as indicated at 68 in Fig. 1.

The fingers 64 and 66 are each pivoted on a pin, such as shown at 70 and 72, which extend out in opposite directions from opposite surfaces of the web portion 74 of the plate 10. The inner end of each finger 64 and 66 is adapted to be contacted by a rod, such as indicated at 76 and 78 (see Figs. 1 and 6), the other end of which is in contact with a cam respectively indicated at 80 and 82, the rods 76 and 78 serving as cam followers for their respective cams.

The cams 80 and 82 are positioned on a common shaft 84 in about 180° offset relationship to each other (as best shown in Fig. 4). The rotation of the shaft 84 and its offset cams 80 and 82 is effected by a gear 86 mounted on the shaft 84 and in mesh with a pinion 88 eccentrically positioned on an arm 900. The arms 90 are each pivoted, as at 92 to their respective sleeves 34 so that as the sleeve 34 rocks about its pivot pin 46, the arm 90 will rock about its pivot pin 92. This rocking of the arms 90 causes rotation of their respective eccentrically-connected pinions 88. Since this rotation is caused by the rocking movement of the sleeve 34 it would only be a normally half-rotation; however, a spring means 94 is attached to each pinion 88 and acts to complete its rotative movement.

During the operation of the engine, the plate 10 rotates, and as it rotates, each piston 18 is moved through a compression, firing and expansion position within its respective cylinder as it reaches a certain position in the rotational path of the plate 10. Just prior to the compression movement, the cam 80 actuates follower rod 76 to move finger 64 to depress the poppet valve 60. This permits injection of the fuel mixture. Then as the cam tip of cam 80 leaves the follower rod 76, the valve 60 closes and the piston 18 begins to move into compression. At a predetermined instant, the spark plug 50 is fired (by a common timing means not shown) to explode the fuel mixture, the expanding explosion gases push on the piston 18 to provide a torque on the plate 10 through the corresponding sleeve 38 and arm 36. The exhaust gases are then passed out through open valve passage 58. The parts are so constructed and arranged that this power stroke takes up about 5/8 of a revolution while the compression stroke takes up about 3/8 of a revolution. The great efficiency of the engine is therefore quite apparent.

The fuel mixture is taken in through valve passage 56 while the exhaust gases are vented through valve passage 58. These alternate actions are effected by the rotationally offset cams 80 and 82. When the cam 80 is in position to act through follower rod 76 to open the valve 60, cam 82 is inoperative so that valve 62 remains closed. On the other hand, while cam 80 is inoperative, cam 82 acts through follower rod 78 to open valve 62 to vent the exhaust gases.

The cams 80 and 82 are fixed to the cam shaft 84 so as to operate the intake and exhaust valves in proper sequence and at the proper time, being spaced substantially 90° apart so that during the outstroke of the piston 18, the link 90 pivoted at one end to the corresponding sleeve 34 turns the pinion 88 by means of crankpin 94 to which its other end is pivoted, through a portion of the cycle of operation of the camshaft during which the cam 80 has opened the intake valve. The camshaft gear 86 has twice the number of teeth than pinion 88 which drives it has, so that it turns one complete revolution for every four piston strokes, in accordance with the four stroke cycle principle of operation. The exhaust cam 82 is spaced substantially 90° ahead of cam 80 on the camshaft.

The cylinders are arranged to fire in the order 1-3-2-4 if they are numbered clockwise as viewed in Fig. 1, or in the direction of rotation of the disc 10, and the camshafts 84 are timed accordingly.

The valve chamber 52 is connected through conduit 96 to manifold 98 surrounding the lower shaft portion 42 (as viewed in Fig. 2). The manifold 98 is connected to a source of fuel (not shown) through lateral openings 100 in the shaft portion 42. The other valve chamber 54 is connected by conduit 102 to a manifold 104 surrounding the upper shaft portion 42 (as viewed in Fig. 2). This manifold 104 is connected to suitable exhaust ports (not shown) through lateral openings 106 in the corresponding shaft portion 42.

It should be noted that the cylinders are provided with longitudinally-arranged cooling fins 108 which act, in the normal manner, to control the temperature of the cylinders.

Figure 7:
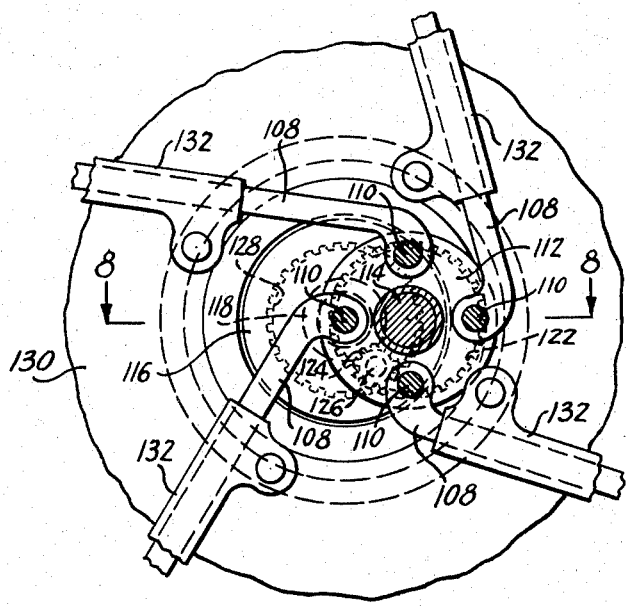
Fig. 7 is an elevational view of the drive mechanism of a modified form of the present invention.
Figure 8:
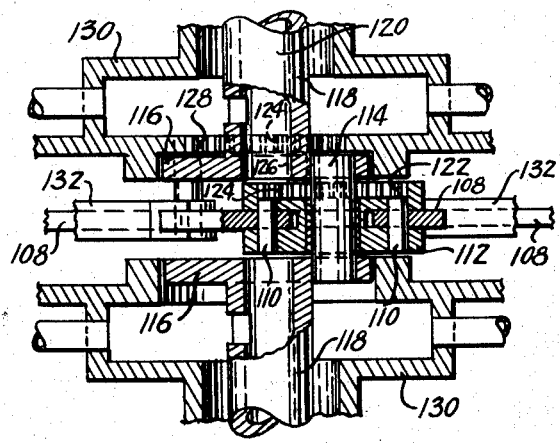
Fig. 8 is a sectional view taken on line 8—8 of Fig. 7.

In Figs. 7 and 8 there is illustrated a modification of the device shown in Figs. 1-6 wherein, instead of having each arm 36 connected to the eccentric pin 38, as in Fig. 1, each arm 108, equivalent to arms 36, is connected to a separate pivot pin 110 which is positioned on a disc 112 in annularly-spaced relationship to other pins 110. The disc 112 is itself rotatably positioned on a pin 114 which is eccentrically mounted between flanges 116 on the shaft portions 118 of a fixed shaft 120. The disc 112 is also provided with an annular, internal ring gear 122 which meshes with a pinion 124. The pinion 124 is mounted on a shaft 126 having a second pinion, not shown, at its other end. This second pinion meshes with an internal ring gear 128 on the lower wall of the manifold 130.

In operation, the disc carrying the engine rotates around the shaft 118. During this rotation, the ring gear 128 rotates and, in turn, rotates the pinion in mesh therewith. This rotates the shaft 126 and consequently the other pinion 124. The pinion 124, in mesh with ring gear 122 rotates this ring gear and consequently causes rotation of the disc 112. As the disc 112 rotates around the eccentric pin 114, it carries the pivot pins 110 and, therefore, the arms 108 around with it. Since the arms 108 rotate eccentrically to the shaft 118 at the axis of rotation of the engine, these arms 108 reciprocate in their respective sleeves 132 in similar manner to arms 36 in Fig. 1.

The remainder of the structure and operation of the engine modification illustrated in Figs. 7 and 8 is essentially similar to that illustrated in regard to the engine shown in Figs. 1-6.

The use of the entire motor block as a flywheel not only reduces the number of parts necessary for operation of the engine but makes the unit more compact and sturdy. Furthermore, this construction which utilizes a power stroke of 5/8 of a revolution for each cylinder, enables the four cylinders illustrated to provide greater power than the ordinary eight-cylinder engine.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A rotary engine device comprising a fixed shaft, an engine block rotatably positioned on said fixed shaft, a plurality of cylinders mounted on said engine block in spaced relationship to each other and in substantial tangential relationship to the axis of rotation of said engine block, a piston mounted for reciprocation in each cylinder, linkage connecting each piston to a fixed crank pin, said crank pin being eccentric to the fixed shaft, fuel supply valve means and gas exhaust valve means on each cylinder, said supply and exhaust valve means being alternately opened and closed in timed relationship to the movements of said pistons by means of a pinion connected to the linkage associated with each piston, said pinion being rotatable by means of the movement of said linkage and being in mesh with a gear operatively connected with said supply and exhaust valve means, and ignition means connected to each cylinder for actuation in timed relationship with the movement of the piston therein, the linkage connecting each piston to the crank pin comprising a connecting rod pivoted at one end to the piston and at its other end to a crank arm, an offset sleeve rigidly connected to the crank arm at one end and pivoted to the engine block at its other end, and an arm extending reciprocably through the sleeve, said arm being mounted for rotation on said crank pin.

2. The engine device of claim 1 wherein each sleeve is provided with one of said pinions, each pinion being rotatable in accordance with the rocking movement of the sleeve, and wherein cam means are connected to each of said gears, and means for opening and closing said fuel supply and gas exhaust valves on the corresponding cylinder operatively associated with said cam means.

3. A rotary engine device comprising a fixed shaft, an engine block rotatably positioned on said fixed shaft, a plurality of cylinders mounted on said engine block in spaced relationship to each other and in substantial tangential relationship to the axis of rotation of said engine block, a piston mounted for reciprocation in each cylinder, linkage connecting each piston to a fixed crank pin, said crank pin being eccentric to the fixed shaft, fuel supply valve means and gas exhaust valve means on each cylinder, said supply and exhaust valve means being alternately opened and closed in timed relationship to the movements of said pistons by means of a pinion connected to the linkage associated with each piston, said pinion being rotatable by means of the movement of said linkage and being in mesh with a gear operatively connected with said supply and exhaust valve means, and ignition means connected to each cylinder for actuation in timed relationship with the movement of the piston therein, the linkage connecting each piston to the crank pin comprising a connecting rod pivotally connected at one end to the piston and at its opposite end to a crank arm, an offset sleeve rigidly connected at one end to the crank arm and pivotally connected to the engine block at its opposite end, an arm reciprocably extending through each sleeve, each arm having one end pivotally connected to a disc, said disc being rotatable around said crank pin, and drive means acting to rotate said disc in timed relationship with the rotation of said engine block.

4. The engine device of claim 3 wherein said disc is provided with a ring gear in mesh with a pinion operatively connected to a second pinion in mesh with a second ring gear on said engine block.

5. In a rotary internal combustion engine, a plurality of cylinders, a piston reciprocably positioned in each cylinder, linkage connecting said pistons to an oscillating means, fuel inlet valve means and gas exhaust valve means on each cylinder, and actuating means operatively associated with said linkage to alternately open and close said fuel and exhaust valve means, said actuating means comprising a crank arm pivotally connected to said linkage and rockable about its pivot by the movement of said linkage, a pinion eccentrically connected to said crank arm, a gear in mesh with said pinion, said gear being mounted on a shaft coaxially with a pair of rotationally offset cams, a follower in contact with each cam, a separate rockable finger in contact with each follower, and a poppet valve positioned in said fuel inlet valve means and in said gas exhaust valve means, each poppet valve being spring-pressed into closed position and being in contact with a respective rockable finger, each rockable finger being actuatable by its respective follower to move its corresponding poppet valve into open position against the force of the corresponding valve spring.

6. The engine of claim 5 wherein said oscillating means comprises a rotatable engine block and a pivotal connection of said linkage to said engine block in eccentric relation to the axis of rotation of said engine block.

7. The engine of claim 5 wherein each cylinder is provided with longitudinal cooling fins on its external surface.

8. A rotary internal combustion engine comprising a fixed, hollow shaft, an engine block rotatable around said hollow shaft, a plurality of cylinders on said engine block, a reciprocable piston in each cylinder, linkage connecting each piston to said engine block in a manner to translate the rotary movement of said engine block into reciprocating movement of the pistons, fuel inlet valve means and gas exhaust valve means on each cylinder, each of said valve means including a valve chamber in communication with a separate manifold on the engine block, said manifolds being in communication through said hollow shaft with a source of fuel and an exhaust venting means respectively, and valve actuating means associated with said linkage for alternately opening said fuel inlet valve means and said gas exhaust valve means, said linkage being pivotally connected to a rotatable disc mounted for rotation on an axis eccentric to the axis of rotation of said engine block and operatively connected to said engine block to be driven thereby.

References Cited in the file of this patent

UNITED STATES PATENTS

| 1,108,980 | Edqvist | Sept. 1, 1914 |
| 1,243,691 | Blayney | Oct. 23, 1917 |
| 1,912,604 | Valentine | June 6, 1933 |

FOREIGN PATENTS

| 862,229 | Germany | Jan. 8, 1953 |